(12) United States Patent
Shishido

(10) Patent No.: US 10,030,677 B2
(45) Date of Patent: Jul. 24, 2018

(54) FLUID CONTROL VALVE

(71) Applicant: SMC CORPORATION, Chiyoda-ku (JP)

(72) Inventor: Kenji Shishido, Adachi-ku (JP)

(73) Assignee: SMC CORPORATION, Chiyoda-ku (JP)

( * ) Notice: Subject to any disclaimer, the term of this patent is extended or adjusted under 35 U.S.C. 154(b) by 227 days.

(21) Appl. No.: 14/913,602

(22) PCT Filed: Aug. 21, 2014

(86) PCT No.: PCT/JP2014/071864
§ 371 (c)(1),
(2) Date: Feb. 22, 2016

(87) PCT Pub. No.: WO2015/029866
PCT Pub. Date: Mar. 5, 2015

(65) Prior Publication Data
US 2016/0208825 A1 Jul. 21, 2016

(30) Foreign Application Priority Data

Sep. 2, 2013 (JP) ................................. 2013-181334

(51) Int. Cl.
*F15B 11/04* (2006.01)
*F16K 15/00* (2006.01)

(52) U.S. Cl.
CPC .......... *F15B 11/0413* (2013.01); *F16K 15/00* (2013.01); *F15B 2211/8855* (2013.01); *Y10T 137/7781* (2015.04)

(58) Field of Classification Search
CPC ....... Y10T 137/7781; Y10T 137/87547; Y10T 137/87265; Y10T 137/87394;
(Continued)

(56) References Cited

U.S. PATENT DOCUMENTS 4,262,695 A 4/1981 Iizumi
4,559,964 A * 12/1985 Yamaguchi ........... A61M 3/025
137/107

(Continued)

FOREIGN PATENT DOCUMENTS

CN 1356481 A 7/2002
JP 58 1807 1/1983
(Continued)

OTHER PUBLICATIONS

Combined Office Action and Search Report dated Jan. 5, 2017 in Chinese Patent Application No. 201480048310.9 (with English translation of Categories of Cited documents).

(Continued)

*Primary Examiner* — Jessica Cahill
(74) *Attorney, Agent, or Firm* — Oblon, McClelland, Maier & Neustadt, L.L.P.

(57) ABSTRACT

Inside a valve housing equipped with a first flow path and a second flow path that connect in parallel with a first port and a second port, there are provided a needle valve body that opens/closes a throttle hole in the first flow path, a check valve that opens/closes the second flow path, and a piston that performs an open/close control of the needle valve body through the interaction of the pressure of a fluid introduced into a pressure chamber and the spring force of a compression spring. The needle valve body is formed at the tip of a rod coupled to the piston. Inside the rod and the needle valve body there is formed a conduction hole connecting the throttle hole and the pressure chamber.

11 Claims, 9 Drawing Sheets

(58) Field of Classification Search
CPC ..... Y10T 137/87555; Y10T 137/87563; F15B 11/0413; F15B 2211/8855; F16K 15/00
See application file for complete search history.

(56) References Cited

U.S. PATENT DOCUMENTS

| | | | |
|---|---|---|---|
| 6,131,610 A * | 10/2000 | Morisako | F15B 13/01 |
| | | | 137/601.19 |
| 6,227,231 B1 | 5/2001 | Hosono et al. | |
| 6,279,451 B1 * | 8/2001 | Hirano | F15B 15/224 |
| | | | 91/405 |
| 6,296,013 B1 | 10/2001 | Hosono et al. | |
| 9,115,811 B2 * | 8/2015 | Yamada | F16K 1/00 |
| 2002/0148513 A1 | 10/2002 | Christiani et al. | |
| 2014/0077114 A1 * | 3/2014 | Shishido | F16K 1/04 |
| | | | 251/267 |
| 2015/0300380 A1 * | 10/2015 | Ueda | F15B 11/0413 |
| | | | 60/462 |

FOREIGN PATENT DOCUMENTS

| | | |
|---|---|---|
| JP | 59 7667 | 3/1984 |
| JP | 59 12404 | 4/1984 |
| JP | 2 45524 | 12/1990 |
| JP | 7 35106 | 2/1995 |
| JP | 2000 320503 | 11/2000 |
| JP | 2000 322128 | 11/2000 |
| JP | 2004-11822 A | 1/2004 |

OTHER PUBLICATIONS

International Search Report dated Oct. 28, 2014, in PCT/JP2014/071864 Filed Aug. 21, 2014.

* cited by examiner

FLUID CONTROL VALVE

TECHNICAL FIELD

The present invention relates to a fluid control valve that controls the flow rate, pressure, etc. of a pressure fluid that is supplied to or discharged from an actuator such as a hydropneumatic cylinder.

BACKGROUND ART

As fluid control valves that control the flow rate, pressure, etc. of a pressure fluid supplied to or discharged from an actuator, such as a hydropneumatic cylinder, when the actuator is driven, fluid control valves that have various configurations are known as disclosed in, for example, PTL 1, PTL 2, etc.

This type of fluid control valve is configured so as to have various functions according to purposes of use as a fluid control valve that performs a meter-in type control in which the flow rate at the time of supplying gas is restricted and the flow rate at the time of discharging gas is not restricted, a fluid control valve that performs a meter-out type control in which the flow rate at the time of supplying gas is not restricted and the flow rate at the time of discharging gas is restricted, a fluid control valve that performs quick discharge at the time of discharging gas to prevent delay in activation, etc. usually by combining a needle valve that restricts the flow rate or pressure of the pressure fluid by constricting the flow path, a flow rate regulating valve that opens/closes a flow path by interaction between fluid pressure and spring force, a check valve that allows the pressure fluid to pass only in one direction, etc.

However, in the foregoing related-art fluid control valves, the needle valve, the flow rate regulating valve, the check valve, etc. are individually incorporated inside the valve housing, so that the structure is often complicated and large in size, leading to problems of being inconvenient in adjustment or handling and being low in ease of use. Therefore, advent of a fluid control valve that is further reduced in size and high in ease of use has been desired.

CITATION LIST

Patent Literature

PTL 1: Japanese Unexamined Patent Application Publication No. 2000-320503
PTL 2: Japanese Unexamined Patent Application Publication No. 2000-322128

SUMMARY OF INVENTION

Technical Problem

An object of the present invention is to provide a fluid control valve that has a rational design structure that is simple in structure and further reduced in size by incorporating a needle valve, a flow rate regulating valve, a check valve, etc., in rational combination and arrangement into a valve housing.

Solution to Problem

In order to achieve the foregoing object, the fluid control valve of the present invention includes, inside a valve housing that includes a first port through which a pressure fluid is input and a second port through which the pressure fluid is output, a first flow path and a second flow path that connect in parallel with the first port and the second port, a needle valve unit that opens/closes the first flow path, a check valve unit that opens/closes the second flow path, and an open/close control unit that performs an open/close control of the needle valve unit.

The needle valve unit, the open/close control unit, and the check valve unit are disposed coaxially along one axis. The needle valve unit includes a throttle hole that forms a part of the first flow path and a needle valve body that opens/closes the throttle hole. The needle valve body is formed on a distal end of a rod that extends linearly along the axis and is freely displaceable along a direction of the axis together with the rod. The check valve unit is configured so as to stop flow of the fluid from the first port toward the second port and permit flow of the fluid from the second port toward the first port. The open/close control unit includes a piston provided on the rod, a pressure chamber formed at a side of the piston, and a compression spring for setting an operating pressure of the piston which is provided at another side of the piston. A conduction hole that connects the throttle hole and the pressure chamber is formed inside the rod and the needle valve body. An end of the conduction hole has an opening in a distal end of the needle valve body. Another end of the conduction hole communicates with the pressure chamber.

In the present invention, the needle valve body is configured so that while fluid pressure in the second port is lower than a set pressure set by the compression spring, the needle valve body stays at an initial position at which the throttle hole is restrictedly opened and so that when the fluid pressure in the second port becomes higher than the set pressure set by the compression spring, the needle valve body is displaced together with the piston and the rod so as to fully open or fully close the throttle hole.

According to a concrete configuration mode of the present invention, in the valve housing there is formed a partition wall that divides the needle valve unit and the open/close control unit, the rod air-tightly and freely slidably extends through the partition wall with a seal member interposed, the needle valve body is formed integrally with a portion of the rod which is at a distal end side of the seal member, and the piston is provided on a portion of the rod which is at a rear end side of the seal member.

In this case, it is desirable that a diameter of a sliding portion of the rod which air-tightly slides inside the partition wall be larger than a diameter of the needle valve body.

Preferably in the present invention, the fluid control valve includes an opening degree adjustment mechanism for adjusting an initial degree of opening of the needle valve unit.

According to one concrete configuration mode of the present invention, the opening degree adjustment mechanism is formed by connecting the rod and the piston by screw coupling so as to be relatively displaceable in the directions of the axis and the needle valve body is displaced to adjust the initial degree of opening by positional adjustment of the rod relative to the piston.

According to another concrete configuration mode of the present invention, the opening degree adjustment mechanism includes a handle for rotationally operating the rod and a cam mechanism that displaces the rod in the directions of the axis due to rotation of the rod. It is desirable that the cam mechanism include a spiral cam surface formed on the valve housing so as to surround the rod and a moving piece that is formed on the rod and that contacts the cam surface, and that the cam mechanism be configured so that as the moving piece is moved along the cam surface by rotationally operating the rod via the handle, the rod and the needle valve body are displaced in the directions of the axis to adjust the initial degree of opening.

According to still another concrete configuration mode of the present invention, the opening degree adjustment mechanism includes an adjustment rod connected to the rod and an adjustment member that moves the adjustment rod forward/backward, the adjustment member is screw-coupled to the valve housing so as to be freely movable forward/backward, and the opening degree adjustment mechanism is configured so that as the rod is moved forward/backward via the adjustment rod by operating the adjustment member, the needle valve body is moved forward/backward to adjust the initial degree of opening.

Furthermore, in the present invention, the open/close control unit is configured so that the piston is urged by the compression spring in such a direction that the needle valve is closed and so that, by fluid pressure introduced in the pressure chamber, the piston is pressurized in such a direction that the needle valve body is opened, or the open/close control unit is configured so that the piston is urged by the compression spring in such a direction that the needle valve body is opened and so that, by fluid pressure introduced in the pressure chamber, the piston is pressurized in such a direction that the needle valve body is closed.

Advantageous Effects of Invention

According to the present invention, because the function of the needle valve and the function of the flow rate control valve in the known fluid control valve are, in a unified state, incorporated coaxially within the valve housing, a fluid control valve that, in comparison with the known fluid control valve, is simple in structure and reduced in size and has a rational design structure can be obtained.

DESCRIPTION OF EMBODIMENTS

Figure 1:
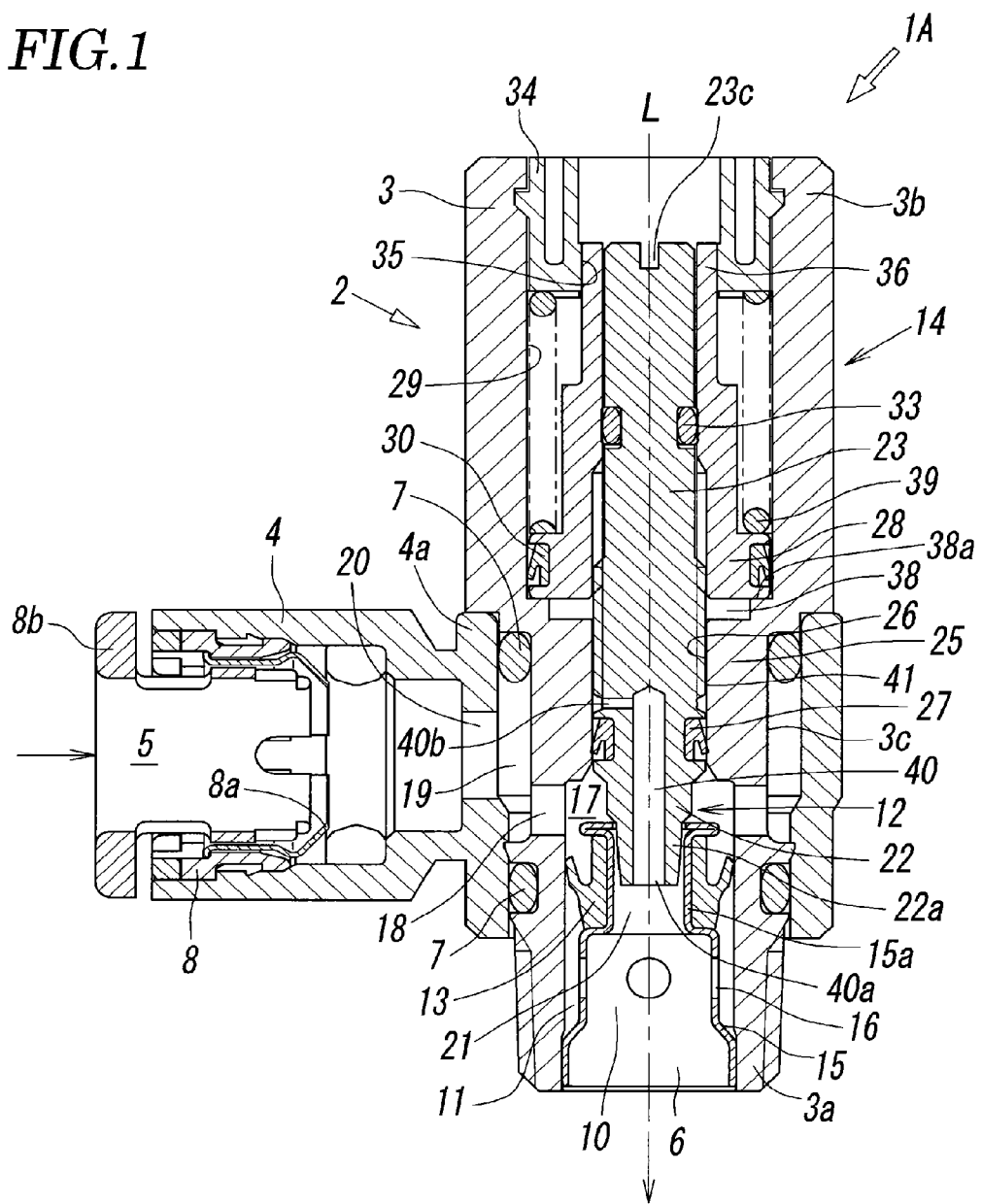
FIG. 1 is a sectional view showing a first embodiment of a fluid control valve according to the present invention in an initial state.

FIG. 1 to FIG. 4 are diagrams showing a first embodiment of a fluid control valve according to the present invention. This fluid control valve 1A is a meter-in control-mode fluid control valve that controls the flow rate of a pressure fluid (e.g., compressed air) supplied to a hydropneumatic actuator such as a hydropneumatic cylinder.

The fluid control valve 1A has a valve housing 2 that has a first port through which the pressure fluid is input and a second port through which the pressure fluid is output. This valve housing 2 is made up of a hollow cylindrical main block 3 that has the second port 6 at a side of a first end 3a of the center hole that is an end thereof in an axis L direction and a port block 4 that has at its distal end the first port 5. A fitting portion 3c of the main block 3 is fitted into a tube portion 4a formed in a rear end portion of the port block 4 so that the fitting portion 3c is relatively pivotable about the axis L. O-rings 7 are interposed between an upper end portion inner peripheral surface and a lower end portion inner peripheral surface of the tube portion 4a and an upper end portion outer peripheral surface and a lower end portion outer peripheral surface, respectively, of the fitting portion 3c.

A simple connection type pipe joint 8 is attached to the first port 5. As for the pipe joint 8, when an end of a piping connected to the hydropneumatic cylinder or the like is inserted into the pipe joint 8, a plurality of locking pieces 8a bite into an outer periphery of the piping and therefore lock the piping so that the piping is in a slip-off prevention state, and when a release bushing 8b is pushed into the pipe joint 8, a distal end of the release bushing 8b expands the locking pieces 8a outward and separates the locking pieces 8a from the piping so that the piping can be pulled out.

Inside the main block 3 there are provided a first flow path 10 and a second flow path 11 that connect in parallel with the first port 5 and the second port 6, a needle valve unit 12 that opens/closes the first flow path 10, a check valve unit 13 that opens/closes the second flow path 11, and an open/close control unit 14 that performs an open/close control of the needle valve unit 12. The needle valve unit 12, the check valve unit 13, the open/close control unit 14, and the second port 6 are arranged coaxially along the single axis L.

In order to form the first flow path 10 and the second flow path 11, a stepped hollow cylindrical member 15 whose diameter is changed in a plurality of steps is inserted in the first end 3a side of the main block 3, with a small-diameter side of the stepped hollow cylindrical member 15 being toward an inner side of the main block 3. The second port 6 is formed in an outer-side end portion (a lower end portion in the drawing) of the hollow cylindrical member 15. Inside the hollow cylindrical member 15, the first flow path 10 an end of which leads to the second port 6 is formed. The second flow path 11 is formed between an outer periphery of the hollow cylindrical member 15 and an inner periphery of the main block 3. An end of the second flow path 11 and the second port 6 communicate through a plurality of communication holes 16 that are formed in a side surface of the hollow cylindrical member 15.

Furthermore, the first flow path 10 and the second flow path 11 join and become a unified flow path in a valve chamber 17 in which an inner-side end portion (an upper end portion in the drawing) of the hollow cylindrical member 15 is positioned, and then communicate with the first port 5 through a first flow path hole 18 formed in a side surface of the main block 3, an annular flow path 19 formed between an inner periphery of the tube portion 4a and an outer periphery of the fitting portion 3c, and a second flow path hole 20 formed in the port block 4. Therefore, the unified flow path is a part of the first flow path 10 and also a part of the second flow path 11.

Inside the small-diameter portion 15a having the smallest diameter at the inner-side end side of the hollow cylindrical member 15, there is formed a throttle hole 21 that constitutes a part of the needle valve unit 12. The throttle hole 21 forms a part of the first flow path 10. Inside this throttle hole 21, a tapered conical valve head portion 22a forming a distal end of the needle valve body 22 is fitted into the throttle hole 21 from the valve chamber 17 side. The needle valve body 22 and the throttle hole 21 constitute the needle valve unit 12.

The needle valve body 22 is formed at a distal end of a cylindrical rod 23. A rear end portion of the rod 23 extends linearly along the axis L to the open/close control unit 14. The needle valve body 22 and the rod 23 are integrally formed by a metal material that has a bar shape.

The inner-side end (the upper end in the drawing) of the small-diameter portion 15a of the hollow cylindrical member 15 is first bent toward a radially outer side of the small-diameter portion 15 and then bent back toward the radially inner side of the small-diameter portion 15a so that an inside diameter end 15b thereof faces a conical portion 22b of the needle valve body 22 which connects to an upper end of the valve head portion 22a.

The check valve unit 13 is formed by a lip type seal member that has a V sectional shape, and is disposed at such a position as to surround an outer periphery of the small-diameter portion 15a of the hollow cylindrical member 15, with a lip 13a thereof directed in such a direction that the flow of the fluid from the first port 5 toward the second port 6 is stopped and the flow of the fluid from the second port 6 toward the first port 5 is permitted.

In the main block 3 there is formed a partition wall 25 that divides the needle valve unit 12 and the open/close control unit 14. Inside a sliding hole 26 formed in the partition wall 25, the rod 23 extends through air-tightly and freely slidably, with a seal member 27 attached to an outer periphery of the rod 23. And, in the rod 23, the needle valve body 22 is formed in a portion located at the needle valve unit 12 side, that is, at the distal end side of the seal member 27. A piston 28 is attached to a portion located at the rear end side of the seal member 27, that is, the open/close control unit 14 side thereof.

The seal member 27 is a lip type seal member and is disposed in such a direction as to stop the flow of the pressure fluid from the valve chamber 17 toward the open/close control unit 14 and permit the flow of the pressure fluid from the open/close control unit 14 toward the valve chamber 17.

The diameter of a portion (sliding portion) 23a of the rod 23 which air-tightly slides within the sliding hole 26 is larger than the diameter of the needle valve body 22, that is, the diameter of a cylinder portion 22d that connects to the sliding portion 23a via a conical portion 22c and the diameter of the valve head portion 22a connecting to the cylinder portion 22d via the conical portion 22b. Due to this diameter difference between the sliding portion 23a and the needle valve body 22, force in an upward direction in the drawing, that is, force in a valve-opening direction, acts on the needle valve body 22 when fluid pressure acts on the needle valve body 22.

The piston 28 is freely slidably housed within a piston chamber 29 formed inside a second end 3b-side portion of the main block 3, with a seal member 30 attached to an outer periphery of the piston 28. The piston 28 is connected to the rod 23 by screw coupling. That is, the piston 28 and the rod 23 are screw-coupled to each other by screwing a male screw portion 23b formed in a portion of the rod 23 into a screw hole 31a formed in a portion of a center hole 31 of the piston 28. By adjusting the position of the rod 23 in the axis L directions relative to the piston 28 by rotating the rod 23, the extent of entry of the valve head portion 22a of the needle valve body 22 into the throttle hole 21, that is, an initial degree of opening of the throttle hole 21 defined by the needle valve body 22, can be adjusted as desired. Therefore, the foregoing configuration in which the piston 28 and the rod 23 are screw-coupled can be said to be an opening degree adjustment mechanism 32 for adjusting the initial degree of opening of the throttle hole 21.

In the drawing, reference character 23c references an operation groove for locking a distal end of a screw driver when the rod 23 is to be rotated, and reference character 33 references a seal member that seals a gap between the outer periphery of the rod 23 and an inner periphery of the piston 28.

An end cap 34 is fixed to a second end 3b-side end portion of the piston chamber 29. In the end cap 34, as can be understood from FIG. 3 as well, there is formed a non-circular guide hole 35 that has on portions of its inner periphery a pair of parallel flat portions 35a. A noncircular guide portion 36 formed in an upper end portion of the piston 28 so as to have substantially the same external shape as the guide hole 35 is fitted into the guide hole 35. Within the guide portion 36, an upper end portion of the rod 23 is exposed to an external space outside the end cap 34. The guide portion 36 and the guide hole 35 are for the purpose of preventing the piston 28 from rotating when the rod 23 is rotationally operated, and constitute a rotation preventing mechanism for the piston 28.

In the piston chamber 29, a pressure chamber 38 for introducing the pressure fluid is formed between a first surface (lower surface) 28a of the piston 28 and the partition wall 25, and a compression spring 39 is interposed between a second surface (upper surface) 28b of the piston 28 and the end cap 34.

In order to introduce the pressure fluid into the pressure chamber 38, a conduction hole 40 that connects the first flow path 10 (the second port 6) and the pressure chamber 38 is formed inside the rod 23 and the needle valve body 22. A first end 40a of the conduction hole 40 has an opening in the distal end of the needle valve body 22 and a second end 40b at the opposite side to the conduction hole 40 has an opening at a position in a side surface of the rod 23 which is toward the pressure chamber 38 side from the seal member 27. The conduction hole 40 communicates with the pressure chamber 38 through a gap 41 between the outer periphery of the rod 23 and an inner periphery of the sliding hole 26.

And the open/close control of the needle valve body 22 is performed by the rod 23 moving forward/backward in the axis L directions due to interaction among the acting force by the pressure fluid which acts on the needle valve body 22 in an upward direction in the drawing (valve-opening direction), the acting force by the pressure fluid which acts on the piston 28 in the upward direction in the drawing within the pressure chamber 38, and the spring force of the compression spring 39 which acts on the piston 28 in a downward direction in the drawing (valve-closing direction).

In the fluid control valve 1A having the foregoing configuration, during a normal time during which fluid pressure does not act on the needle valve body 22 or the piston 28, the piston 28 is pushed down to the position of a descent end as shown in FIG. 1 by the spring force of the compression spring 39 and contacts a stop portion 38a of the pressure chamber 38, bringing about a state in which the rod 23 and the needle valve body 22 assume an initial position and the throttle hole 21 is restrictedly opened by the valve head portion 22a of the needle valve body 22. The degree of opening of the throttle hole 21 at this time is an initial degree of opening.

When, from this state, the first port 5 is supplied with the pressure fluid, the pressure fluid flows from the restrictedly opened throttle hole 21 toward the second port 6 through the first flow path 10 in a reduced-pressure or restricted-flow rate state. At this time, the fluid pressure acts on the needle valve body 22 in the upward direction in the drawing and, at the same time, acts also on the piston 28 in the upward direction because of inflow to the pressure chamber 38 through the conduction hole 40. However, because that pressure is low, the spring force of the compression spring 39 causes the rod 23 and the needle valve body 22 to maintain the initial position.

Figure 4:
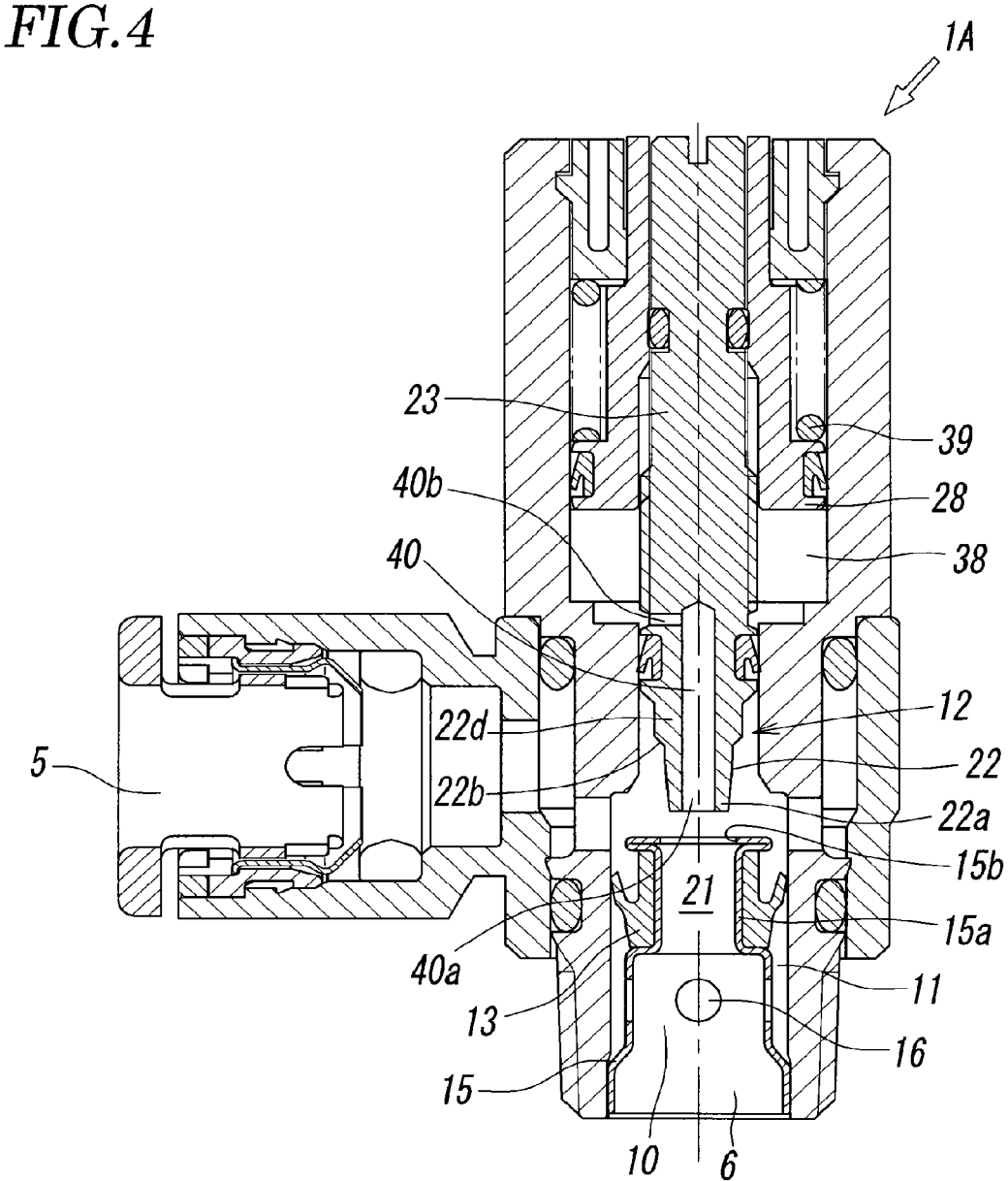
FIG. 4 is a sectional view showing a fully open state of the fluid control valve of FIG. 1.

When the fluid pressure in the second port 6 rises, that fluid pressure is introduced into the pressure chamber 38 through the conduction hole 40 and acts on the piston 28 in the upward direction. When that acting force exceeds the spring force of the compression spring 39, that is, when that acting force exceeds the set pressure set by the compression spring 39, the piston 28 and the rod 23 rise so that the valve head portion 22a of the needle valve body 22 comes completely out of the throttle hole 21 and the needle valve unit 12 becomes fully open, as shown in FIG. 4.

Therefore, the configuration of the needle valve unit 12 and the open/close control unit 14 can be said to be a configuration in which the function of the needle valve and the function of the flow rate control valve in the known fluid control valve 1A are unified. Because the function of the needle valve and the function of the flow rate control valve in the known fluid control valve are unified and that unified configuration is incorporated coaxially within the valve housing, the configuration of the fluid control valve 1A is simplified in comparison with that of the known fluid control valve, so that it becomes possible to obtain a fluid control valve 1A that has a small-size and rational design structure.

Figure 5:
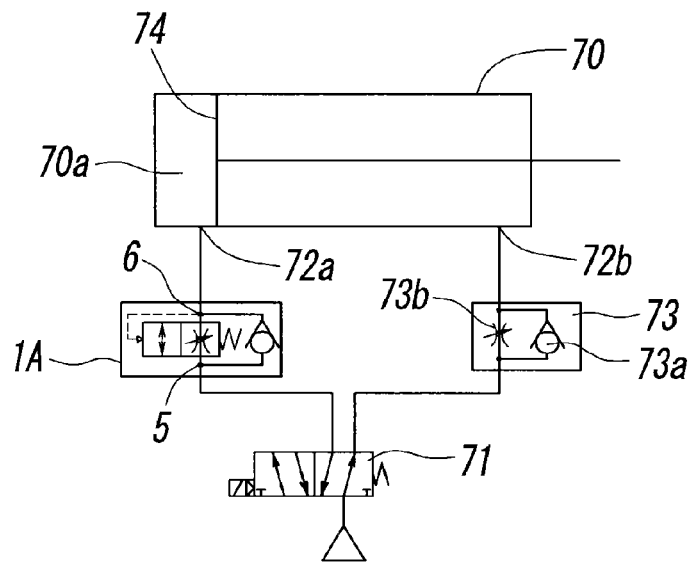
FIG. 5 is a circuit diagram showing an example of a control circuit that controls a hydropneumatic cylinder by using the fluid control valve of FIG. 1.

The fluid control valve 1A is used, for example, to control a hydropneumatic cylinder 70 as in a fluid circuit shown in FIG. 5. In this example, the first port 5 of the fluid control valve 1A is connected to a five-port type electromagnetic valve 71 and the second port 6 is connected to a head-side port 72a of the hydropneumatic cylinder 70. Furthermore, between the electromagnetic valve 71 and a rod-side port 72b of the hydropneumatic cylinder 70 there is connected a speed control valve 73 made up of a check valve 73a and a throttle valve 73b.

Figure 2:
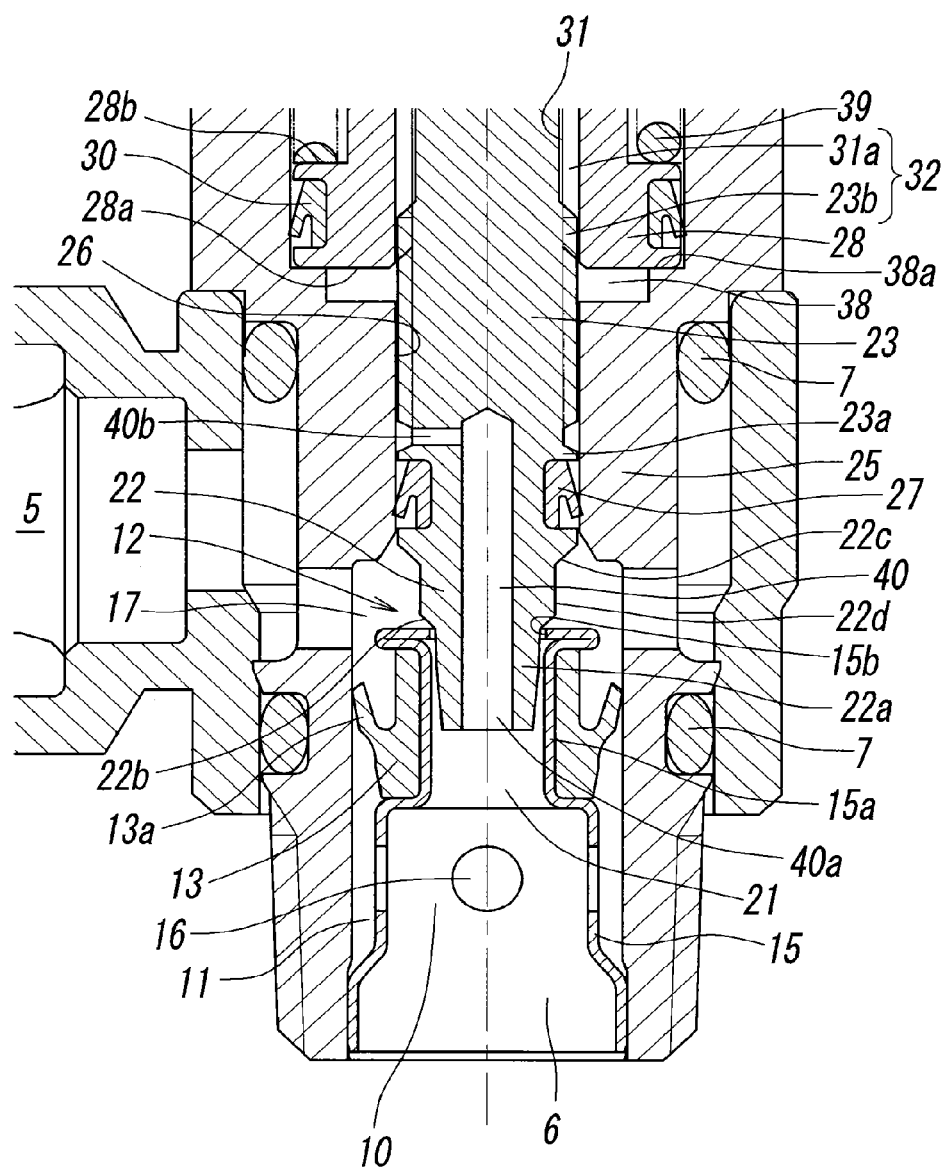
FIG. 2 is an enlarged view of a principal portion of FIG. 1.
Figure 3:
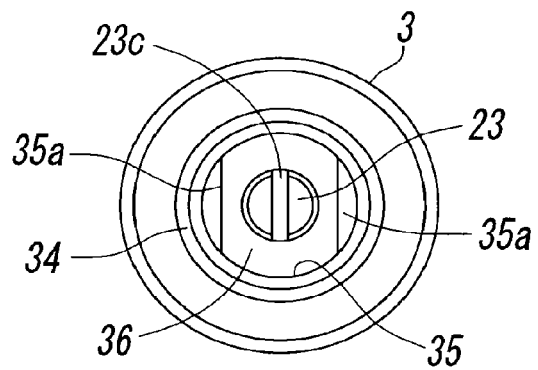
FIG. 3 is a plan view of FIG. 1.

In the foregoing fluid circuit, during the state shown in FIG. 5, the first port 5 of the fluid control valve 1A is not supplied with the pressure fluid (e.g., compressed air) and, therefore, the needle valve body 22 of the fluid control valve 1A assumes the initial position, bringing about a state in which the throttle hole 21 is restrictedly opened as shown in FIG. 1 and FIG. 2.

When, from this state, the electromagnetic valve 71 is switched so that the first port 5 of the fluid control valve 1A is supplied with the pressure fluid, the pressure fluid flows in a restricted-flow rate state from the throttle hole 21 to the second port 6 through the first flow path 10 and flows from the second port 6 into a head-side cylinder chamber 70a of the hydropneumatic cylinder 70, moving a cylinder piston 74 slowly by a meter-in control. At this time, the pressure fluid also flows into the pressure chamber 38 through the conduction hole 40. However, since the pressure in the head cylinder chamber 70a during movement of the cylinder piston 74 is low, the needle valve body 22 maintains its initial position that is a restriction-lifted position due to the spring force of the compression spring 39.

On the other hand, the pressure fluid reaching the check valve unit 13 within the second flow path 11 from the first port 5 is blocked by the check valve unit 13.

When the cylinder piston 74 reaches a stroke end, the pressure in the head-side cylinder chamber 70a rises. When this pressure exceeds the set pressure set by the compression spring 39, the needle valve body 22 is pushed upward as shown in FIG. 4 by a resultant force of the hydropneumatic acting force that acts on the needle valve body 22 and the hydropneumatic acting force that acts on the piston 28 so that the throttle hole 21 is fully opened. Therefore, the pressure fluid is rapidly supplied into the head-side cylinder chamber 70a.

Next, when the electromagnetic valve 71 is switched to the state shown in FIG. 5, the pressure fluid in the head-side cylinder chamber 70a is rapidly discharged from both the check valve unit 13 and the throttle hole 21 of the needle valve unit 12 in the fully open state through the first port 5 and the electromagnetic valve 71 at an initial gas discharge stage where the pressure in the head-side cylinder chamber 70a is high. Then, when the pressure in the head-side cylinder chamber 70a becomes low, the needle valve body 22 returns to the initial position by the spring force of the compression spring 39, so that the throttle hole 21 becomes a restrictedly open state. However, the pressure fluid in the head-side cylinder chamber 70a pushes the check valve unit 13 open and is discharged in a free flow state through the second flow path 11.

Incidentally, in FIG. 1 and FIG. 2, by rotationally operating the rod 23 via the opening degree adjustment mechanism 32 to shift the position of the rod 23 relative to the piston 28 downward in the drawings so that the conical portion 22b of the needle valve body 22 contacts the inside diameter end 15b of the hollow cylindrical member 15, the fluid control valve 1A can be changed into a normally closed type fluid control valve in which the needle valve body 22 is at a closure position during a normal time. In this case, the spring force of the compression spring 39 is set so that when the pressure fluid supplied into the first port 5 acts on the needle valve body 22, the needle valve body 22 compresses the compression spring 39 and rises slightly so that the throttle hole 21 is restrictedly opened.

Figure 6:
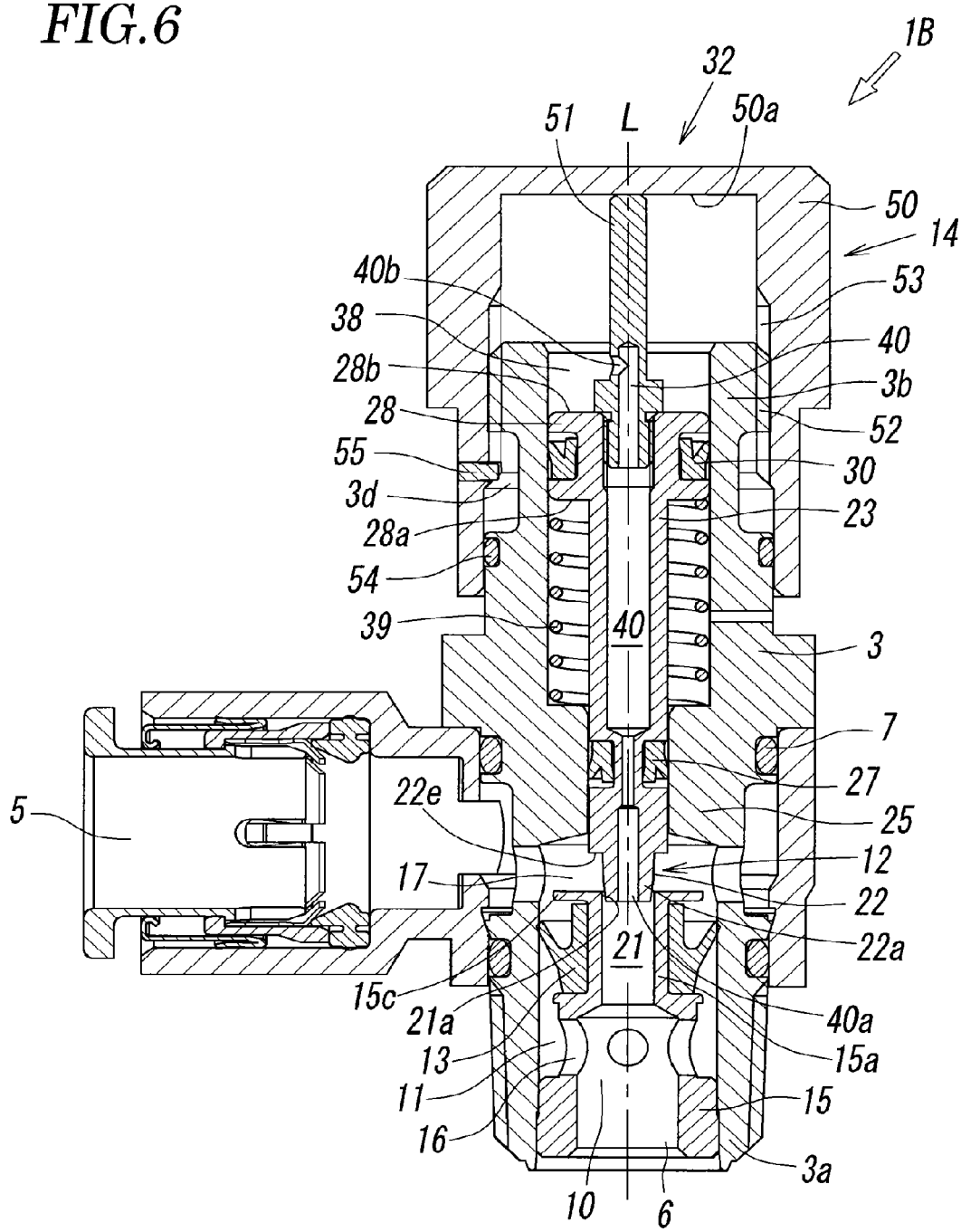
FIG. 6 is a sectional view showing a second embodiment of a fluid control valve according to the present invention in an initial state.

FIG. 6 shows a second embodiment of a fluid control valve according to the present invention. A fluid control valve 1B of the second embodiment, compared with the fluid control valve 1A of the first embodiment, is different in the configuration of the needle valve unit 12 and the open/close control unit 14 that performs the open/close control of the needle valve unit 12 and is substantially the same in the other configurations. Therefore, in the following description, the configurations of the needle valve unit 12 and the open/close control unit will be mainly described. In the description, the same components as in the fluid control valve 1A of the first embodiment will be described using the same reference characters as used in conjunction with the first embodiment.

In the fluid control valve 1B of the second embodiment, the needle valve unit 12 restrictedly opens a throttle hole 21 during the normal time due to a valve head portion 22a of the needle valve body 22 slightly entering the throttle hole 21. The degree of opening (initial degree of opening) of the needle valve body 22 at this time is determined by an opening degree adjustment mechanism 32 made up of an adjustment rod 51 and an adjustment member 50 that serves also as an end cap. This opening degree adjustment mechanism 32 will be described later.

Incidentally, on the needle valve body 22, an annular step portion 22e based on a diameter difference between a rod 23 and the valve head portion 22a is formed between the rod 23 and the valve head portion 22a so as to be orthogonal to an axis L. On an upper end portion of a small-diameter portion 15a of a hollow cylindrical member 15, an annular flange portion 15c that faces the step portion 22e is formed in a direction orthogonal to the axis L.

Furthermore, in the open/close control unit 14, the rod 23 and a piston 28 are integrally formed, a compression spring 39 is interposed between a first surface 28a that is a lower surface of the piston 28 and a partition wall 25, and a pressure chamber 38 for introducing pressure fluid is formed between a second surface 28b that is an upper surface of the piston 28 and the adjustment member 50. Therefore, the compression spring 39 urges the piston 28 in such a direction that the needle valve body 22 opens the throttle hole 21, and the pressure fluid introduced in the pressure chamber 38 pressurizes the piston 28 in such a direction that the needle valve body 22 closes the throttle hole 21.

A conduction hole 40 that connects the pressure chamber 38 and a first flow path 10 extends through a center portion of the rod 23. A first end 40a of the conduction hole 40 has an opening in a distal end of the needle valve body 22. An opposite-side second end 40b of the conduction hole 40 extending via a conduction hole 40 in the adjustment rod 51 screwed to an end portion of the rod 23 (or the piston 28) has an opening in a side surface of the adjustment rod 51 which is open to the pressure chamber 38.

The adjustment member 50, which forms a portion of the opening degree adjustment mechanism 32, performs a function of the end cap defining the pressure chamber 38 by air-tightly covering an open second end 3b of the main block 3 and a function of pressurizing the adjustment rod 51 to adjust the initial degree of opening of the throttle hole 21 which is defined by the needle valve body 22. The adjustment member 50 is screw-coupled to the main block 3 so as to be freely movable back and forth in the axis L directions by screwing a female screw portion 53 formed on an inner peripheral surface of the end cap 34 to a male screw portion 52 formed on an outer periphery of an end portion of the main block 3. An end portion of the adjustment rod 51 is in contact with an inner surface of a ceiling wall 50a of the adjustment member 50.

Then, when the adjustment member 50 is advanced toward a second port 6 side by rotating the adjustment member 50, the piston 28 and the rod 23 are pushed and moved downward in the drawing via the adjustment rod 51, so that the valve head portion 22a of the needle valve body 22 enters deep into the throttle hole 21 and the degree of opening of the throttle hole 21 reduces. When the adjustment member 50 is moved backward, the piston 28 and the rod 23 are displaced upward in the drawing, so that the degree of opening of the throttle hole 21 defined by the needle valve body 22 increases.

In the drawing, reference character 54 references a seal member that air-tightly seals a gap between the outer peripheral surface of the main block 3 and the inner peripheral surface of the adjustment member 50, and reference character 55 references a stopper that determines the position of an advancement end of the adjustment member 50. When the adjustment member 50 is advanced to a position at which the stopper 55 locks with a locking portion 3d provided inside the main block 3, the degree of opening of the needle valve body 22 becomes minimum or a fully closed state.

As for the fluid control valve 1B, during the normal time during which fluid pressure does not act on the needle valve body 22 or the piston 28, the spring force of the compression spring 39 causes the needle valve body 22 to rise so that the valve head portion 22a is slightly inserted within the throttle hole 21 and the throttle hole 21 is restrictedly open, as shown in FIG. 6.

Figure 7:
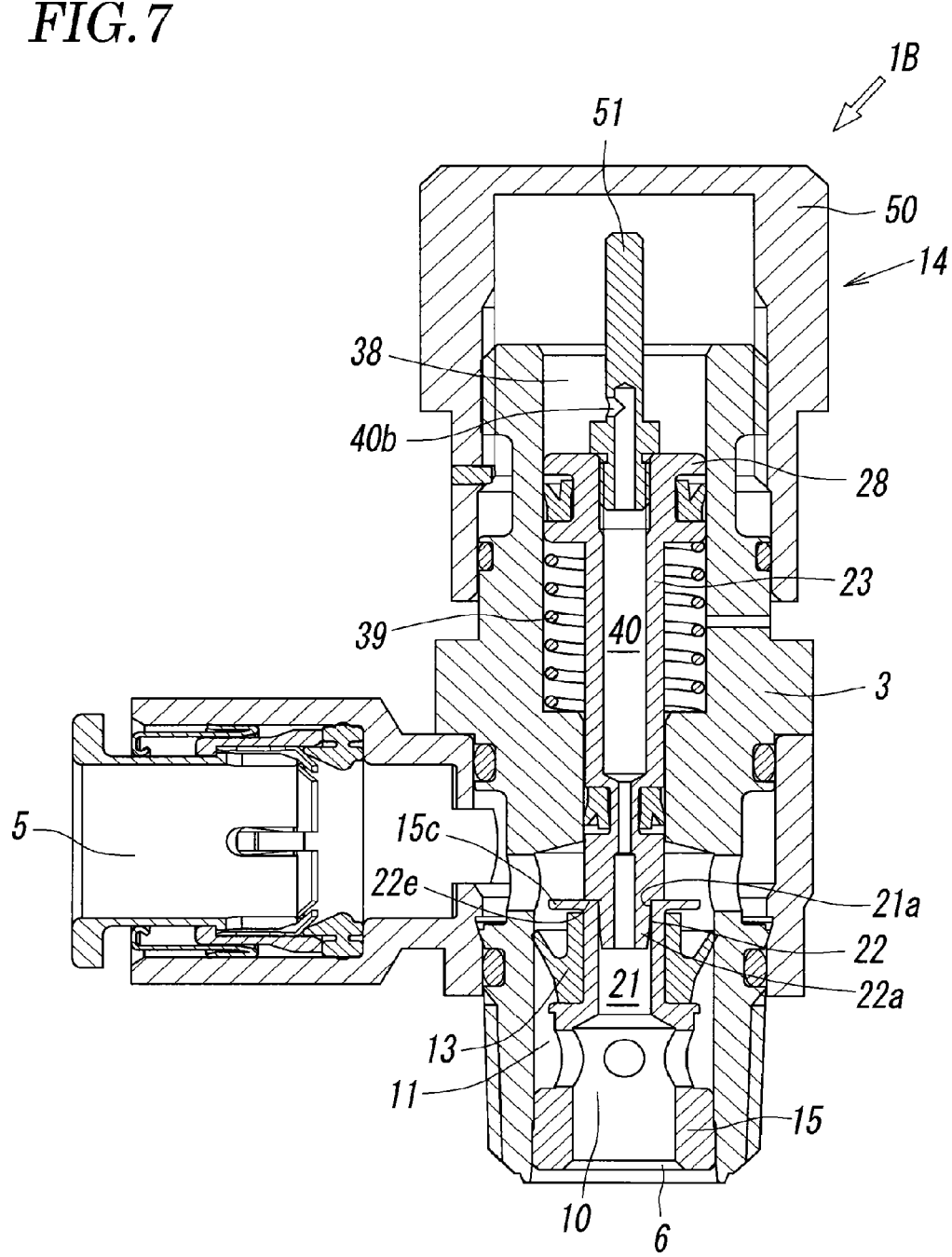
FIG. 7 is a sectional view of the fluid control valve of FIG. 6 in a fully closed state.

Then, as shown in FIG. 7, when the fluid pressure is introduced from the conduction hole 40 into the pressure chamber 38 so that the hydropneumatic acting force on the piston 28 exceeds the spring force of the compression spring 39, the valve head portion 22a of the needle valve body 22 is completely fitted into the throttle hole 21 so that the step portion 22e contacts the upper-end flange portion 15c of the hollow cylindrical member 15 and thus the throttle hole 21 is closed.

Figure 8:
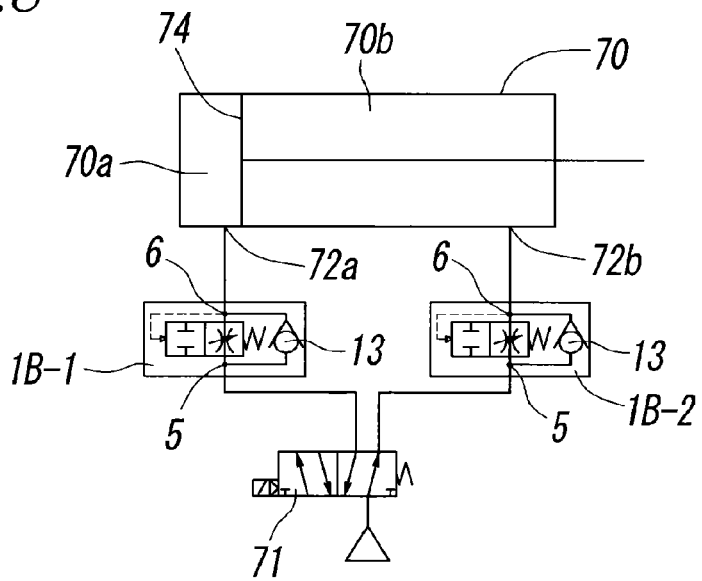
FIG. 8 is a circuit diagram showing an example of a control circuit that controls a hydropneumatic cylinder by using the fluid control valve of FIG. 6.

The fluid control valve 1B of the second embodiment is used, for example, as in a fluid circuit shown in FIG. 8 in which fluid control valves 1B are connected between both a head-side cylinder chamber 70a and a rod-side cylinder chamber 70b of a hydropneumatic cylinder 70 and a five-port type electromagnetic valve 71.

When the electromagnetic valve 71 is switched from a state shown in FIG. 8 so that the first port 5 of a first fluid control valve 1B-1 connected to the head-side cylinder chamber 70a is supplied with the pressure fluid, the pressure fluid flows in a restricted-flow rate state from the restrictedly open throttle hole 21 into the second port 6 through the first flow path 10 and flows from the second port 6 into the head-side cylinder chamber 70a through a head-side port 72a of the hydropneumatic cylinder 70, moving the cylinder piston 74 slowly by a meter-in control. At this time, the pressure fluid also flows into the pressure chamber 38 through the conduction hole 40. However, since the pressure in the head-side cylinder chamber 70a during movement of the cylinder piston 74 is low, the needle valve body 22 maintains its restriction-lifted state due to the spring force of the compression spring 39.

On the other hand, the pressure fluid reaching the check valve unit 13 in the second flow path 11 from the first port 5 is blocked by the check valve unit 13.

Furthermore, in a second fluid control valve 1B-2 connected to the rod-side cylinder chamber 70b, the discharged gas from the rod-side cylinder chamber 70b is discharged from the rod-side port 72b and the second port 6, through the check valve unit 13 of the second flow path 11, and in a free flow state from the first port 5 through the electromagnetic valve 71.

When the cylinder piston 74 reaches the stroke end, the pressure in the head-side cylinder chamber 70a rises. Then, when this pressure exceeds the set pressure set by the compression spring 39 in the first fluid control valve 1B-1, the piston 28 is pushed down due to the effect of the pressure fluid introduced in the pressure chamber 38 and therefore the needle valve body 22 is also pushed down so that the valve head portion 22a is completely fitted into the throttle hole 21 and, at the same time, the step portion 22e contacts the flange portion 15c, as shown in FIG. 7. Therefore, the throttle hole 21 is fully closed and the pressure in the head-side cylinder chamber 70a is maintained.

On the other hand, in the second fluid control valve 1B-2, the needle valve body 22 assumes a normal position that is a restricted open state.

Next, when the electromagnetic valve 71 is switched to a state shown in FIG. 8, the pressure fluid in the head-side cylinder chamber 70a pushes open the check valve unit 13 in the second flow path 11 of the first fluid control valve 1B-1 and is therefore discharged in a free flow state, so that the pressure in the head-side cylinder chamber 70a decreases and the needle valve body 22 opens the throttle hole 21. After that, the pressure fluid in the head-side cylinder chamber 70a is discharged through the opened throttle hole 21 and the check valve unit 13.

On the other hand, the second fluid control valve 1B-2 performs operations that are substantially the same as the operations that the first fluid control valve 1B-1 performs to advance the piston 28.

FIG. 9 to FIG. 12 show a third embodiment of a fluid control valve according to the present invention. Main differences between a fluid control valve 1C of the third embodiment and the fluid control valve 1A of the first embodiment are in the configuration of the valve housing 2 and the configuration of the opening degree adjustment mechanism 32 that adjusts the initial degree of opening of the needle valve unit 12. Hereinafter, the fluid control valve 1C of this third embodiment will be described. In the description, of the components of the fluid control valve 1C, components that are different in form from but have the same functions as those of the fluid control valve 1A of the first embodiment will be described by using the same reference characters as used for the fluid control valve 1A, and components that are substantially the same in form and function as those of the fluid control valve 1A are referenced by the same reference characters as used for those of the fluid control valve 1A and descriptions thereof are omitted.

Figure 9:
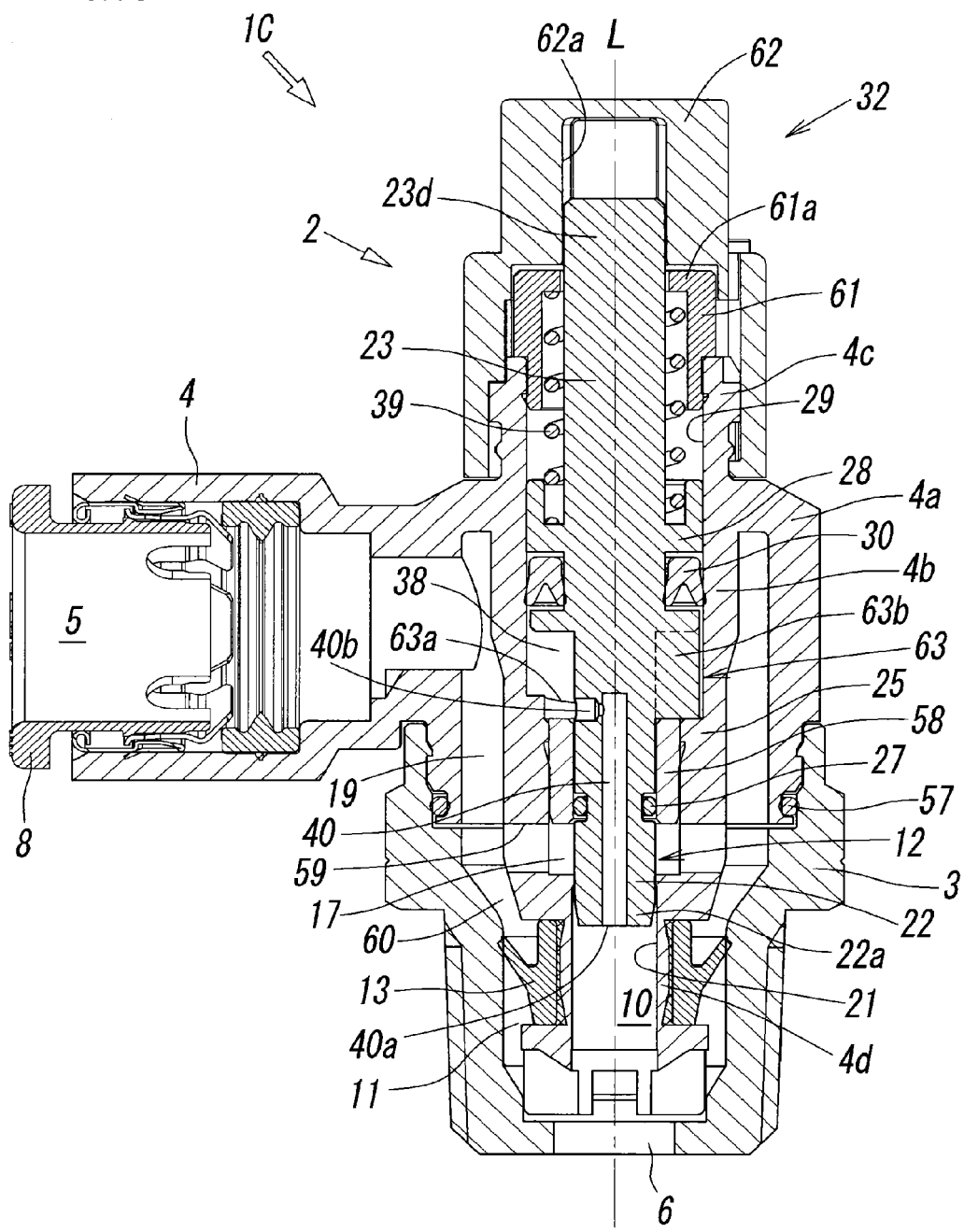
FIG. 9 is a sectional view showing a third embodiment of a fluid control valve according to the present invention, being a view in the case where an initial degree of opening of a needle valve unit has been adjusted to a minimum degree of opening.

As shown in FIG. 9, a valve housing 2 of the fluid control valve 1C includes a port block 4 that includes a first port 5 and a main block 3 that includes a second port 6. In this fluid control valve 1C, the port block 4 has most of the functions that the main block 3 and the hollow cylindrical member 15 have in the fluid control valve 1A of the first embodiment, as is apparent from the following description.

Inside a tube portion 4a of the port block 4 (hereinafter, referred to as "outer tube portion 4a" for the sake of convenience), a hollow cylindrical inner tube portion 4b extending along the axis L is integrally joined to the outer tube portion 4a at an upper end portion of the outer tube portion 4a and thus formed concentrically with the outer tube portion 4a. Between an outer periphery of the inner tube portion 4b and an inner periphery of the outer tube portion 4a there is formed an annular flow path 19 that leads to the first port 5. An upper end portion 4c of the inner tube portion 4b protrudes upward beyond the upper end of the outer tube portion 4a and a lower end portion of the inner tube portion 4b protrudes downward beyond a lower end of the outer tube portion 4a. The main block 3 is connected to an outer periphery of a lower end portion of the outer tube portion 4a, with a seal member 57 interposed therebetween, so as to surround a portion of the lower end portion of the inner tube portion 4b which protrudes beyond the outer tube portion 4a.

A small-diameter portion 4d is formed integrally with the lower end portion of the inner tube portion 4b. Inside the small-diameter portion 4d there are formed a first flow path 10 and a throttle hole 21. On an outer periphery of the small-diameter portion 4d there are provided a second flow path 11 and a check valve unit 13. The first flow path 10, extending from the throttle hole 21, communicates with the annular flow path 19 through the valve chamber 17 and a flow path hole 59 formed in a side surface of the inner tube portion 4b. The second flow path 11 communicates with the annular flow path 19 through an annular communication passageway 60 formed between an outer periphery of the lower end portion of the inner tube portion 4b and an inner periphery of the main block 3.

Furthermore, inside the inner tube portion 4b, the valve chamber 17 and a piston chamber 29 are formed with a partition wall 25 interposed therebetween. A tubular guide 58 made of brass is fitted air-tightly and in a fixed manner inside the partition wall 25. A rod 23 is freely slidably supported by the guide 58 with a seal member 27 interposed. A needle valve body 22 is formed integrally with a distal end (lower end) of the rod 23. A conical valve head portion 22a of the needle valve body 22 is inserted in the throttle hole 21. A piston 28 is formed integrally with a portion of the rod 23 which is positioned within the piston chamber 29.

Incidentally, because the guide 58, integrated with the partition wall 25, performs the function of dividing the valve chamber 17 and the piston chamber 29, it can be said that the guide 58 forms a portion of the partition wall 25.

A tubular end cover 61 made of brass is attached to the upper end portion 4c of the inner tube portion 4b. An upper end portion 23d of the rod 23 extends through a lid portion 61a of the end cover 61 and protrudes above the end cover 61. A compression spring 39 is interposed between a lower surface of the lid portion 61a of the end cover 61 and an upper surface of the piston 28.

The opening degree adjustment mechanism 32 includes a handle 62 for rotationally operating the rod 23 and a cam mechanism 63 that displaces the rod 23 in the axis L directions as the rod 23 rotates.

The handle 62 is a hollow cylindrical cap-shaped member and is attached to the upper end portion 4c of the inner tube portion 4b so as to be freely rotationally operable while covering the upper end portion 4c, the end cover 61, and the upper end portion 23d of the rod 23. The upper end portion 4c of the rod 23 is fitted into a locking hole 62a formed inside the handle 62. The locking hole 62a is a noncircular hole that has a pair of flat portions at mutually facing positions on the hole wall. The upper end portion 23d of the rod 23 also has a pair of flat portions at opposite positions on the outer periphery. These flat portions mutually contact and lock with each other, so that the handle 62 and the rod 23 are fixed in rotating directions.

The cam mechanism 63 includes a moving piece 63b formed on the rod 23 and a spiral cam surface 63a that is formed at a position above the partition wall 25 inside the inner tube portion 4b of the port block 4 so as to surround the rod 23.

Figure 10:
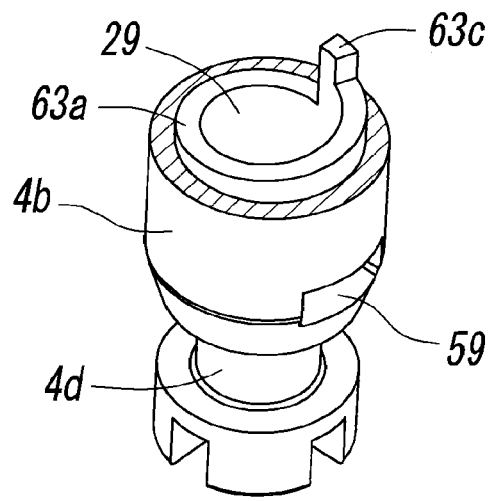
FIG. 10 is a partially cut-away perspective view showing a spiral cam surface by cutting a valve housing.

The cam surface 63a, as is apparent from FIG. 10, is sloped in such a direction that the height of the cam surface 63a becomes gradually low clockwise, that is, in a direction toward the throttle hole 21. A stopper 63c that the moving piece 63b contacts is formed at a boundary site between the lowest portion and the highest portion of the cam surface 63a.

Figure 11:
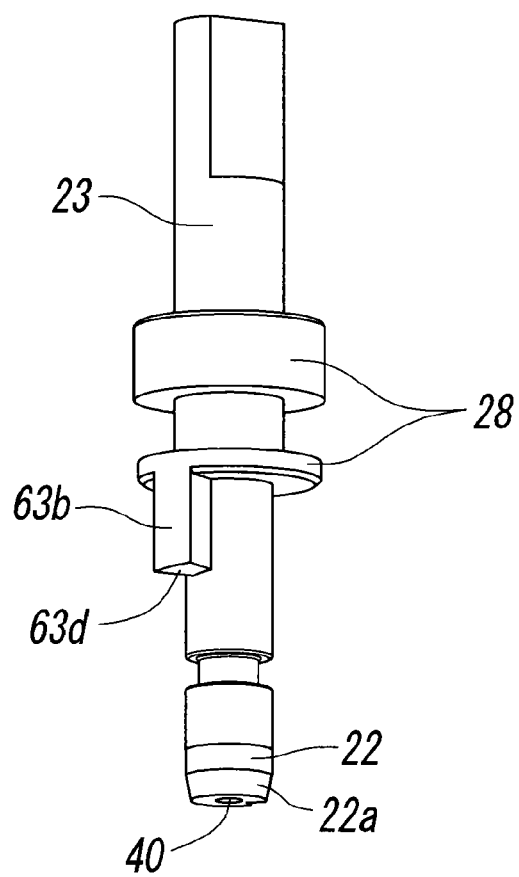
FIG. 11 is a perspective view of a needle valve body.

On the other hand, the moving piece 63b, as is apparent from FIG. 11, extends from a lower surface of the piston 28 integrated with the rod 23 in the axis L directions along a side surface of the rod 23, and a lower end surface 63d of the moving piece 63b is in contact with the cam surface 63a.

Then, when the rod 23 is rotationally operated clockwise or counterclockwise by using the handle 62, the moving piece 63b is displaced along the inclined cam surface 63a so that the rod 23 is moved forward or backward in the axis L directions and therefore the extent of entry of the valve head portion 22a of the needle valve body 22 into the throttle hole 21 changes. Thus, the initial degree of opening of the throttle hole 21 is adjusted.

Figure 12:
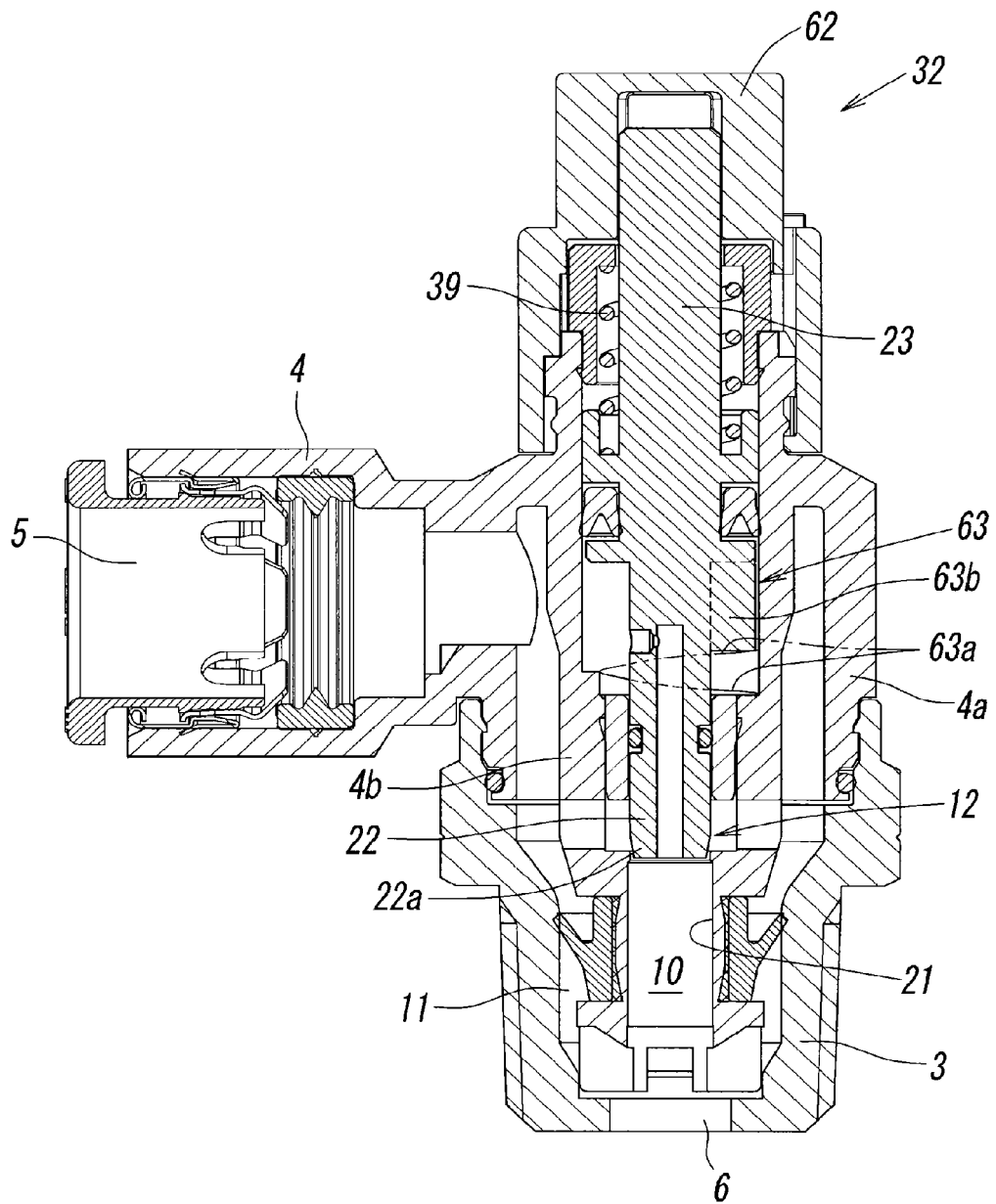
FIG. 12 is a sectional view in the case where the initial degree of opening of the needle valve unit of the fluid control valve of FIG. 9 has been adjusted to a maximum degree of opening.

FIG. 9 shows a state in which the moving piece 63b contacts a lowest portion of the cam surface 63a, so that the rod 23, that is, the needle valve body 22, assumes a position of maximum advancement, bringing about a state in which the initial degree of opening of the throttle hole 21 defined by the needle valve body 22 is a minimum degree of opening. When, from this state, the rod 23 is rotated approximately one rotation counterclockwise by using the handle 62, the moving piece 63b moves counterclockwise along the cam surface 63a, so that the rod 23, that is, the needle valve body 22, is moved backward in the axis L directions while rotating. When the moving piece 63b moves to the highest portion of the cam surface 63a and contacts the stopper 63c, the needle valve body 22 assumes a position of maximum withdrawal as shown in FIG. 12 and the initial degree of opening of the throttle hole 21 defined by the needle valve body 22 becomes a maximum degree of opening.

The handle 62 can be locked at any desired rotational position. According to the rotation angle of the handle 62, the initial degree of opening of the throttle hole 21 can be set to any desired degree between the minimum degree of opening and the maximum degree of opening.

Incidentally, the configurations and operations of the fluid control valve 1C of the third embodiment other than what have been described above are substantially the same as those of the fluid control valve 1A of the first embodiment and, therefore, descriptions thereof are omitted.

REFERENCE SIGNS LIST 1A, 1B, 1C: fluid control valve
2: valve housing
5: first port
6: second port
10: first flow path
11: second flow path
13: check valve unit
14: open/close control unit
21: throttle hole
22: needle valve body
23: rod
25: partition wall
27: seal member
28: piston
32: opening degree adjustment mechanism
38: pressure chamber
39: compression spring
40: conduction hole
50: adjustment member
51: adjustment rod
62: handle
63: cam mechanism
63a: cam surface
63b: moving piece
L: axis

The invention claimed is:

1. A fluid control valve comprising:
inside a valve housing that includes a first port through which a pressure fluid is input and a second port through which the pressure fluid is output, a first flow path and a second flow path that connect in parallel with the first port and the second port, a needle valve unit that can open and close the first flow path, a check valve unit that can open and close the second flow path, and an open/close control unit that performs an open and close control of the needle valve unit, wherein
the needle valve unit, the open/close control unit, and the check valve unit are disposed coaxially along one axis;
the needle valve unit includes a throttle hole that forms a part of the first flow path and a needle valve body that can open and close the throttle hole, and the needle valve body is formed on a distal end of a rod that extends linearly along the one axis and is freely displaceable along a direction of the one axis together with the rod;
the check valve unit is configured so as to stop flow of the fluid from the first port toward the second port and permit flow of the fluid from the second port toward the first port;
the open/close control unit includes a piston provided on the rod, a pressure chamber formed at a side of the piston, and a compression spring for setting an operating pressure of the piston which is provided at another side of the piston; and
a conduction hole that connects the throttle hole and the pressure chamber is formed inside the rod and the needle valve body, an end of the conduction hole has an opening in a distal end of the needle valve body, and another end of the conduction hole communicates with the pressure chamber.

2. The fluid control valve according to claim 1, wherein, while fluid pressure in the second port is lower than a set pressure set by the compression spring, the needle valve body stays at an initial position at which the throttle hole is restrictedly opened and when the fluid pressure in the second port becomes higher than the set pressure set by the compression spring, the needle valve body is displaced together with the piston and the rod so as to fully open or fully close the throttle hole.

3. The fluid control valve according to claim 1, wherein, in the valve housing, there is formed a partition wall that divides the needle valve unit and the open/close control unit, the rod air-tightly and freely slidably extends through the partition wall with a seal member interposed, the needle valve body is formed integrally with a portion of the rod which is at a distal end side of the seal member, and the piston is provided on a portion of the rod which is at a rear end side of the seal member.

4. The fluid control valve according to claim 3, wherein a diameter of a sliding portion of the rod which air-tightly slides inside the partition wall is larger than a diameter of the needle valve body.

5. The fluid control valve according to claim 1, further comprising an opening degree adjustment mechanism for adjusting an initial degree of opening of the throttle hole defined by the needle valve body.

6. The fluid control valve according to claim 5, wherein the opening degree adjustment mechanism is formed by connecting the rod and the piston by screw coupling so as to be relatively displaceable in the directions of the axis and the needle valve body is displaced to adjust the initial degree of opening by positional adjustment of the rod relative to the piston.

7. The fluid control valve according to claim 5, wherein the opening degree adjustment mechanism includes a handle for rotationally operating the rod and a cam mechanism that displaces the rod in the directions of the axis due to rotation of the rod.

8. The fluid control valve according to claim 7, wherein the cam mechanism includes a spiral cam surface formed on the valve housing so as to surround the rod and a moving piece that is formed on the rod and that contacts the cam surface, and the cam mechanism is configured so that as the moving piece is moved along the cam surface by rotationally operating the rod via the handle, the rod and the needle valve body are displaced in the directions of the axis to adjust the initial degree of opening.

9. The fluid control valve according to claim 5, wherein the opening degree adjustment mechanism includes an adjustment rod connected to the rod and an adjustment member that is configured to move the adjustment rod forward and backward, the adjustment member is screw-coupled to the valve housing so as to be freely movable forward and backward, and the opening degree adjustment mechanism is configured so that as the rod is moved forward and backward via the adjustment rod by operating the adjustment member, the needle valve body is moved forward and backward to adjust the initial degree of opening.

10. The fluid control valve according to claim 1, wherein the open/close control unit is configured so that the piston is urged by the compression spring in such a direction that the needle valve body is closed and so that, by fluid pressure introduced in the pressure chamber, the piston is pressurized in such a direction that the needle valve body is opened.

11. The fluid control valve according to claim 1, wherein the open/close control unit is configured so that the piston is urged by the compression spring in such a direction that the needle valve body is opened and so that, by fluid pressure introduced in the pressure chamber, the piston is pressurized in such a direction that the needle valve body is closed.

* * * * *